United States Patent [19]

Orth et al.

[11] 4,061,079
[45] Dec. 6, 1977

[54] LOAD SENSING PULL-TYPE HYDRAULIC AMPLIFYING FLUID MOTOR

[75] Inventors: Harold R. Orth, Hinsdale; William C. Swanson, Clarendon Hills, both of Ill.

[73] Assignee: International Harvester Company, Chicago, Ill.

[21] Appl. No.: 683,105

[22] Filed: May 4, 1976

[51] Int. Cl.² ............................ F15B 9/10; F15B 13/10
[52] U.S. Cl. .......................................... 91/372; 91/378; 91/391 R
[58] Field of Search ................. 91/372, 373, 378, 371, 91/370

[56] References Cited

U.S. PATENT DOCUMENTS

| | | | |
|---|---|---|---|
| 717,810 | 1/1903 | Carmichael | 91/378 |
| 2,384,962 | 9/1945 | Pohl | 91/378 |
| 2,909,157 | 10/1959 | Reis | 91/372 |
| 2,926,635 | 3/1960 | Leonard et al. | 91/378 |
| 2,959,156 | 11/1960 | Dreptin | 91/378 |
| 3,199,413 | 8/1965 | Morgetts | 91/372 |
| 3,532,027 | 10/1970 | MacDuff et al. | 91/372 |

*Primary Examiner*—Paul E. Maslousky
*Attorney, Agent, or Firm*—Douglas W. Rudy; Floyd B. Harman

[57] ABSTRACT

A fluid operated motor amplifies input force and communicates a greater amount of output force to a reaction device. Input effort is directly proportional to the amplified output effort. A power piston residing in a cylinder bore has an input rod, having a spool valve and a reaction piston, laterally movable through a bore in the power piston. Fluid flow is metered to a working chamber by the spool valve in response to the position of the input rod. An output rod moves with the power piston to deliver an amplified force to a linkage.

6 Claims, 5 Drawing Figures

LOAD SENSING PULL-TYPE HYDRAULIC AMPLIFYING FLUID MOTOR

BACKGROUND OF THE INVENTION

1. Field of the Invention

This invention relates to hydraulic devices capable of transducing and amplifying an input signal to provide a stronger output signal or force.

More specifically this device is especially compatible for use on a tractor or other similar vehicle as a clutch operating cylinder, a brake operating cylinder or an implement operating cylinder.

2. Description of the Prior Art

Present state of the art clutch operating devices in use on contemporary tractors and other vehicles may be one of several types. Two of the more common are mechanical linkages and hydraulic slave cylinder types.

A mechanical linkage may be of a solid non-flexible type of may be cable operated. The solid mechanical linkage is most usual on tractors as the vehicle operator and the operating pedal is situated over the clutch bell housing.

In a clutch slave cylinder system the slave cylinder is supplied with a source of fluid pressure, either from a master cylinder, a hydraulic accumulator, or a hydraulic fluid pump, that urges the piston to be displaced through a bore. An output rod pushed by the slave cylinder piston effects the displacement of a linkage. Clutch operation with either system causes a pressure plate to be released from engagement with a clutch plate thus effectively separating the direct couple between the vehicle engine and the vehicle transmission. This allows easier gear shifting in the transmission.

Difficulties in these types of clutch actuation have recently developed as the size of the clutches in tractors increase to keep pace with the increase in engine horsepower outputs. As the engine output increases stronger and stronger clutch biasing springs are needed to insure positive clutch engagement between the transmission and the flywheel. Frequent clutch engagement with either the slave cylinder type or the purely mechanical clutch linkage, results in operator fatigue due to the input effort necessary to overcome the strong clutch springs. Also a problem with the slave cylinder type clutch disengagement apparatus is that it is difficult to get feedback from the system. Thus the operator is not aware of the degree of clutch engagement resulting from his depression of the clutch pedal.

The hydraulic amplifying fluid motor of this disclosure overcomes the above complaints concerning prior art devices by providing amplified force output while also providing full feed back to the operator.

SUMMARY OF THE INVENTION

A hydraulic amplifying fluid motor is provided for use as an operating motor for, among other things, operating a clutch on a vehicle. The device amplifies an input force to deliver an output force that has been significantly amplified while concurrently providing feedback to the input force.

The hydraulic amplifying fluid motor consists of a body having an input port and a discharge port communicating fluid to an internal bore. A power piston is slidably carried in the bore and is attached to an output rod. An input rod incorporates a spool valve and a reactor piston integral therewith. The input rod spool valve portion may be moved relative to passages inside of the power piston to allow fluid to pass through the power piston to a chamber above the power piston in the bore of the body. A power piston spring may bias the power piston to an undisplaced position of repose in the bore. An input rod spring biases the input rod to a position such that the spool valve of the input rod will now allow fluid to pass to the chamber above the power piston.

A plurality of fluid passages are capable of allowing fluid flow to the chamber above the power piston, to a secondary chamber and finally to a reservoir.

One of the objects of this invention is to provide a power assisted fluid motor for use in disengaging a clutch that amplifies the force input generated by the vehicle operator such that a heavy duty clutch can be disengaged with a reduced amount of operator effort eliminating a portion of the fatigue factor intrinsic to the operation of a "heavy clutch."

A further and equally important object of this invention is to provide a clutch disengagement device that will provide feedback information to an operator to enable the operator to sense when clutch engagement or disengagement is taking place.

Another object and unique feature of this invention is that a mechanism is provided wherein the output rod will follow, in either direction, the position or direction of the input rod.

Another advantage of this invention is that, being of the closed circuit variety, this force amplifier or servomechanism doesn't depend upon throttling, pressure balance or flow rates to find its proper position. Further advantages are that the device of this invention develops a feedback force proportional to the load regardless of the amount of hydraulic pressure available from the power source. Also the device can be operated manually through the mechanical association of the input rod and the output rod through the power piston should hydraulic fluid power be unavailable.

BRIEF DESCRIPTION OF THE DRAWINGS

These and other objects and advantages of the invention will be apparent from the following disclosure in light of the drawings in which:

FIG. 1 presents a side elevation view of the hydraulic amplifying cylinder shown mounted to the fire wall of a portion of a vehicle, while

DETAILED DESCRIPTION OF THE INVENTION

Figure 1:
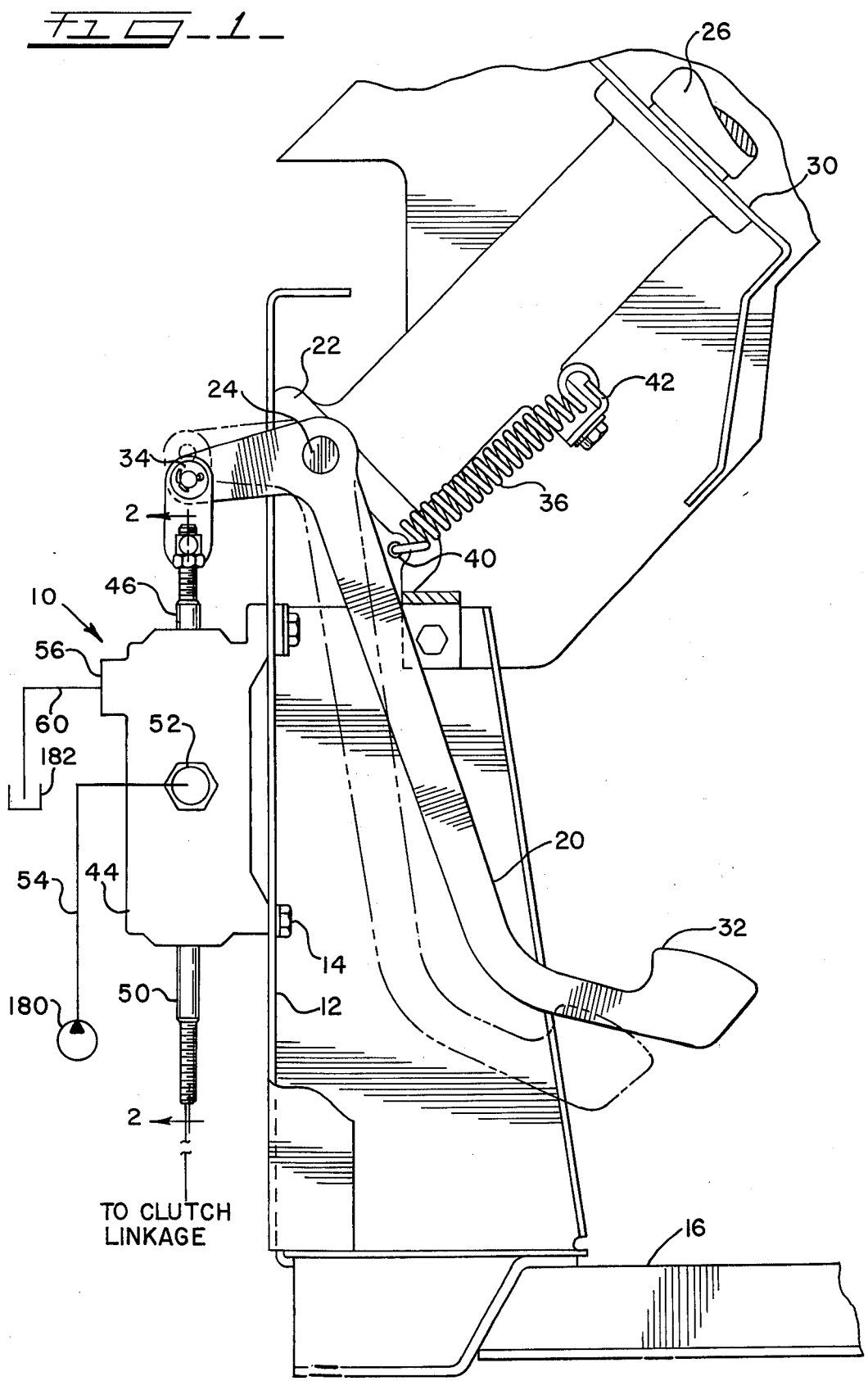

FIG. 1 presents an embodiment of a typical environment of the invention. The power assisted fluid motor, generally 10, is mounted by a fastener such as 14 to a panel 12 which may be part of a firewall structure of the vehicle (not shown in its entirety). The panel 12 may be supported on a floor 16 which would comprise the floor or an operator's work station. A suspended clutch pedal 20 is mounted to a multi-purpose bracket 22 such that the clutch pedal can pivot around axle 24 from which it is suspended.

In FIG. 1 a portion of the steering column 26 is shown having its lower portion mounted to the multi-purpose bracket 22. An instrument panel 30 is also shown in the figure.

The clutch pedal 20 is a bellcrank wherein the first end incorporates a foot contact portion 32 while a second end of the bellcrank incorporates attachment means 34 affording a means to link the clutch pedal 20 to the hydraulic amplifying fluid motor 10.

A clutch pedal spring 36 is provided to assist in returning the clutch pedal 20 to an undepressed position. The clutch pedal spring 36 will be attached to the clutch pedal 20 at spring attaching aperture 40 while the other end of the spring may be attached to a nonmovable component in the environment such as the bracket 42.

The hydraulic amplifying fluid motor, generally 10, in FIG. 1 may be further described as having a body 44, an input rod 46, which is linked to the suspended clutch pedal 20 by means of the attachment means 34, and an output rod 50 which is further connected to clutch linkage which is not shown. It is understood that the clutch linkage would be appropriate linkage for disengaging the clutch such that a vehicle engine and a transmission would not be locked together (generally termed "engaged"). Hydraulic fluid may be supplied to the amplifying fluid motor 10 through inlet port 52 which may be associated by supply conduit 54 to a fluid supply pump 180. A discharge port 56 in the body 44 of the amplifying fluid motor 10 may allow fluid delivery to a reservoir 182 by means of a discharge conduit 60.

Figure 2:
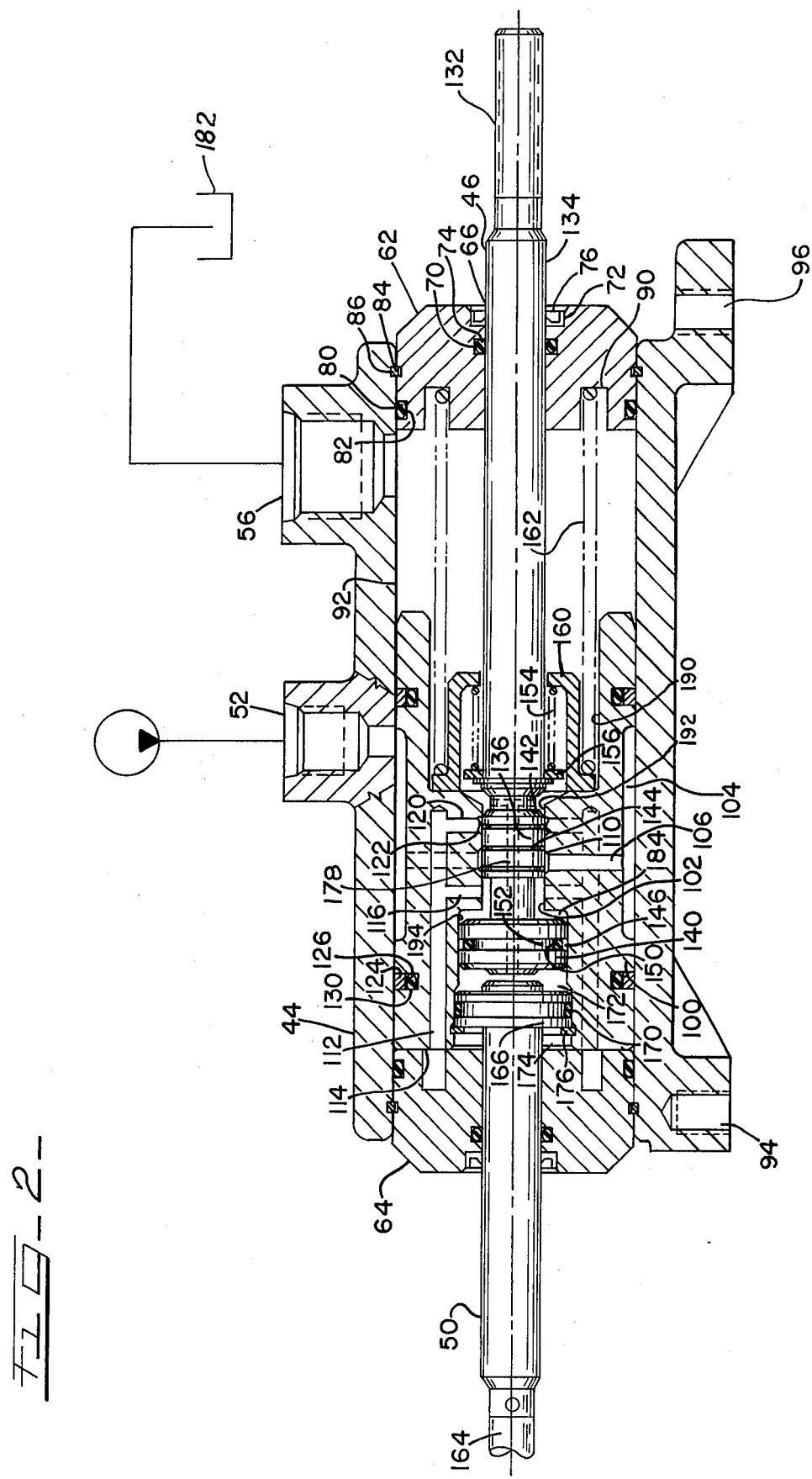
FIG. 2 shows a cross sectional view of the invention taken through plane 2—2 of FIG. 1 in an attitude of repose.

The amplifying fluid motor 10 is shown in a cross section view in FIG. 2. In that figure the amplifying fluid motor is shown in an attitude of repose. FIGS. 2, 3, 4, and 5 all show the hydraulic amplifying fluid motor, however, each view depicts a separate phase of the piston displacement. Thus in these views reference characters are identical for identical items in each view.

Directing our attention to FIGS. 2, 3, 4, and 5 the mechanism and operation of the cylinder will be explained.

The figures show that the body 44 which includes identical end caps, the input side endcap being 62 and the output side endcap being 64 is a closed cylinder having fluid access ports. Each endcap being identical only the input side end cap 62 will be described in detail. In each endcap there is a central aperture 66 through the endcap that allows the passage of either the input rod 46 or the output rod 50 (output side endcap 64). The aperture 66 may have various grooves formed integral therewith such as the gasket groove 70 to which hosts a gasket 74 and the scraper ring groove 72 which hosts a scraper ring 76 to seal the aperture 66 such that undersirable material cannot pass into the interior of the body 44. The outer diameter of each endcap 62 or 64, is also provided with a pair of circumferential grooves. An endcap primary gasket 80 is retained in a endcap primary gasket groove 82 while an endcap retention means 84 is carried in a retention means chamber 86 formed partly in the body 44 and partly in the endcap 62. Each endcap is further provided with the circumferential recess 90 formed in the innermost face of each endcap.

The method of retaining the endcaps 62 and 64 in the body 44 is optional by design. There are numerous alternative means of forming a closed body 44 which could be applied equally well in this application.

The body 44 of the amplifying fluid motor, generally 10, has an inlet port 52 (which has been rotated into the section views of the figures) formed therein which allows fluid to be urged into the interior of the body 44. A discharge port 56 allows spent fluid to be discharged from the interior of the body 44 to a reservoir. The interior of the body 44 is finished as a relatively smooth walled cylindrical chamber 92 as would be expected of a hydraulic valve or a cylinder.

The body 44 may be equipped with mounting apertures such as the fastener receiving cavity 94 or the fastener receiving bolt hole 96.

Figure 3:
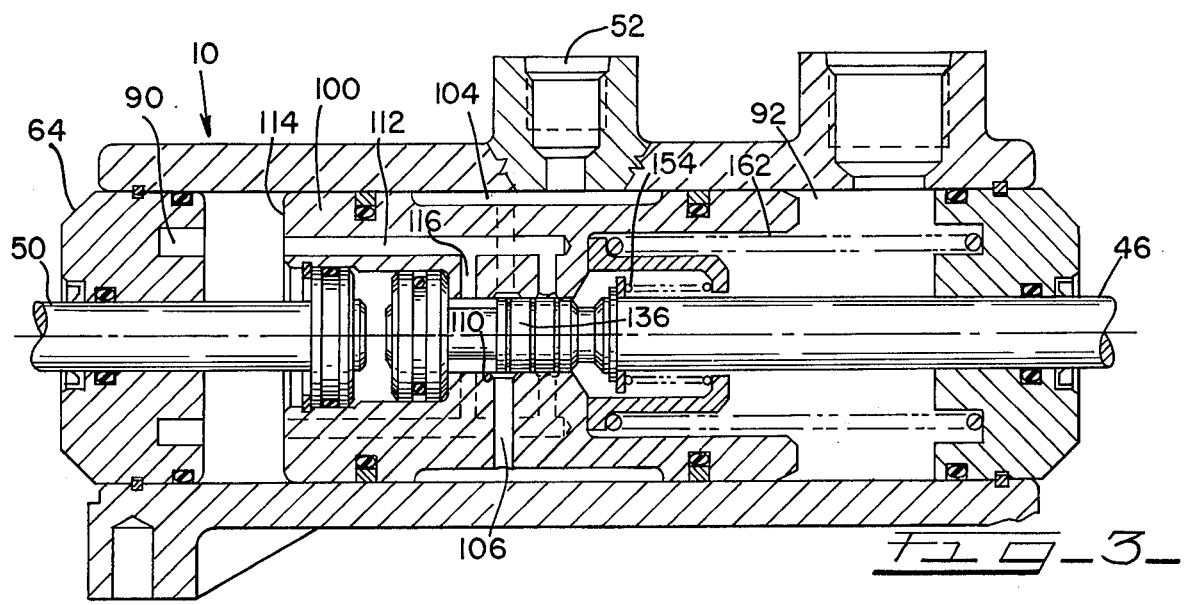
FIG. 3 shows the invention as presented in FIG. 2 in a partially displaced attitude at a stage of further displacement.
Figure 4:
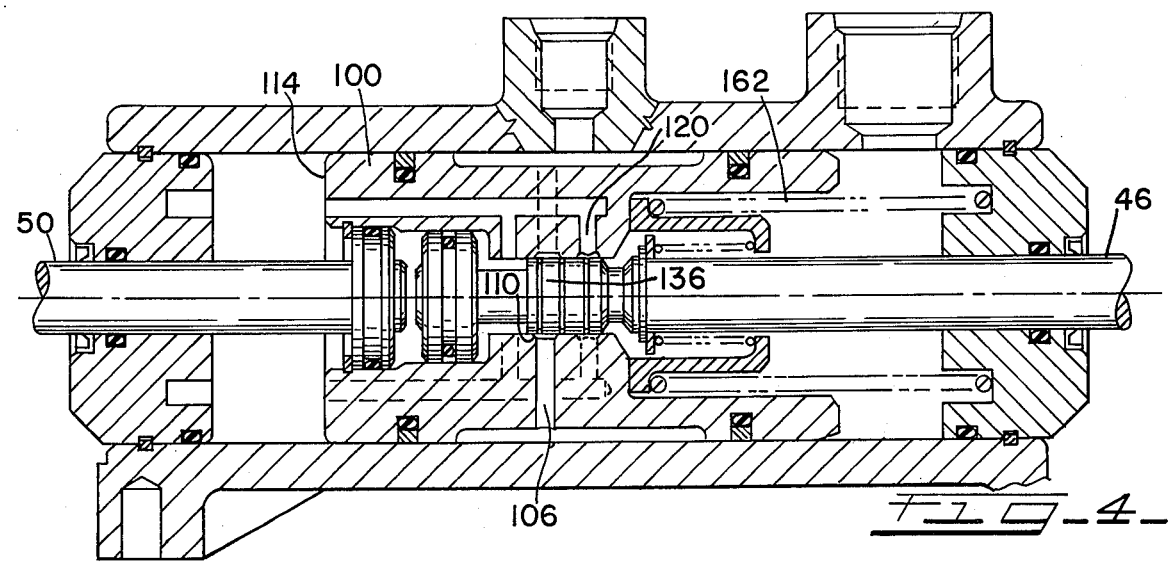
FIG. 4 shows the invention as presented in FIG. 2 in a partially disposed attitude at the termination of further displacement.
Figure 5:
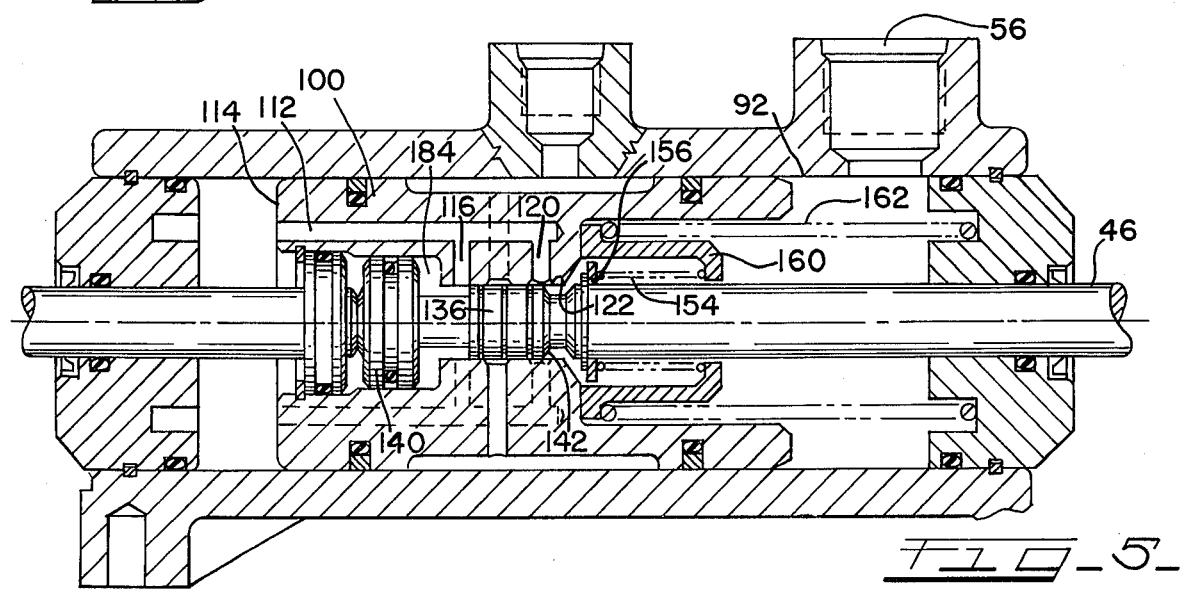
FIG. 5 shows the invention as presented in FIG. 2 in a partially disposed attitude wherein the power piston is being biased to its position of repose.

Slidably carried inside the cylindrical chamber 92 of the body 44 is a power piston 100 which may move from a position of repose as shown in FIG. 2 to various displaced positions as typified by FIGS. 3, 4, and 5. The power piston 100 has a central aperture 102 of mixed diameters formed longitudinally through the center of the power piston 100.

The several diameters may include a first portion 190 for receiving a spring and a cup in one end of the central aperture, a second portion 192 for receiving a spool valve in the central portion of the central aperture and a third portion 194 for receiving a reaction piston in a second end of the central aperture.

Furthermore, a plurality of fluid passages are provided in the power piston. These fluid passages include a circumferential recess 104 girding the power piston 100 of sufficient width or longitudinal dimension to allow fluid to pass from the input port 52 to the circumferential recess 104 regardless of the position of the power piston 100 in the cylindrical chamber 92. The longitudinal dimension of the recess 104 does not allow fluid communication directly between the input port 52 and the discharge port 56 however as this would cause short circuiting of the device. At least one, and in this preferred embodiment — several, radial fluid passages 106 (shown also as a broken line passage) allow fluid communication between the circumferential recess 104 and the central aperture 102 of the power piston 100. A slight circumferential relief 110 is formed in the central aperture 102 to allow fluid to be discharged from a full circumferential port as necessary. This will be explained more thoroughly further on.

At least one longitudinal passage 112 is provided from the top 114 of the power piston 100. This passage does not communicate with the radial fluid passage 106 but does communicate with a lateral inlet passage 116 and a lateral outlet passage 120. The lateral outlet passage 120 terminates at a circumferential relief band 122 formed in the central aperture 102 of the power piston 100. Although only a single set of lateral passages and the longitudinal passages (116, 120, and 112) are provided with reference characters it is possible to have a plurality of sets and an expected embodiment may embody four sets of passages. The power piston 100 may also have a plurality of piston ring assemblies such as the piston ring 124 backed up and urged into contact with the wall of the cylindrical chamber 92 by the elastic ring 126 carried in circumferential piston ring grooves, one shown as 130.

The input rod 46 is a multifunctional component having a threaded end 132, a smooth shaft portion 134, a spool valve portion 136 and a reactor piston 140. The input rod 46 can move laterally (in FIGS. 2 through 5) a sufficient distance through the input side endcap 62 to allow the power piston 100 to travel the length of the cylindrical chamber 92.

The spool valve portion 136 of the input rod 46 is equipped with a chamfer 142 at the right side (as shown in FIGS. 2 through 5) thereof. Also, a trio of fluid channels exemplified by 144 are formed in the spool valve 136 to prevent binding between the surface of the spool valve 136 and the close fitting bore portion of the central aperture 102.

The reaction piston 140 is greater in diameter than the diameter of the spool valve 136 and is movable in a close fitting bore portion of the central aperture 102. The reaction piston 140 is provided with a circumferential sealing ring 146 urged outward by a sealing ring elastic ring 150 both of which are carried in the circumferential groove 152 formed in the reaction piston 140. This arrangement prevents fluid flow past the reaction piston.

An input rod spring 154 is maintained in position on the input rod 46 between a retainer means 156 and the interior of a spring cup 160. The exterior of the spring cup 160 provides a ledge for maintaining a power piston spring 162 between the power piston 100 and the input side endcap 62 where the power piston spring 162 is carried in the circumferential recess 90. The power piston spring 162 biases the power piston 100 toward the output side endcap 64 while the input rod spring 154 biases the input rod 46 toward the power piston 100.

An output rod 50 projects its threaded end 164 and its central portion through the output side endcap 64. The innermost end of the output rod 50 has an enlarged portion 166 carrying a seal ring 170 which prevents fluid flow from the cavity 174 formed outboard of the enlarged portion 166 of the output rod 50 to the chamber 172 and vice versa. A retainer, such as a snap ring 176, maintains the output rod in the central aperture of the power piston.

OPERATION

The operation of the load-sensing pull type hydraulic amplifying fluid motor can best be explained by looking at the various figures in sequence which show various power piston displacements. The general detail figure, FIG. 2, which was used in the detail explanation previously recited is equivalent to the amplifying fluid motor in the position shown in FIG. 1. The progression of the explanation of the operation will coincide with the positions necessitated by the depression of the suspended clutch pedal 20 from its solid line position to its interrupted line position. The interrupted line position corresponds to the displacement of the power piston as shown in FIG. 4. FIG. 3 shows displacement of the power piston corresponding to a clutch pedal depression midway between the solid line position and the interrupted line position of FIG. 1. FIG. 5 presents the operation of the cylinder after the foot pedal has been released and the power piston is travelling toward its position of repose.

Actuation of the hydraulic amplifying fluid motor 10 follows the depression of the suspended clutch pedal as follows. Looking at FIGS. 1 and 3. As the suspended clutch pedal 20 is depressed by the vehicle operator the bellcrank geometry will cause the input rod 46 to be pulled upward out of the hydraulic amplifying fluid motor 10. This will result in the output rod 50 being pulled upward (FIG. 1) into the unit by means of the power piston displacement. Hydraulic fluid will have been pumped to the amplifying fluid motor 10 from a source of fluid pressure such as the pump 180 via the supply conduit 54. A clear picture of what is taking place inside the amplifying fluid motor 10 is shown in FIG. 3.

The input rod 46 is being moved to the right (FIG. 3 is a static presentation of a progressive displacement) thus bringing the integral spool valve 136 to the right also. Input rod spring 154 is compressed. Movement of the spool valve 136 opens fluid passages and allows fluid under pressure to reach the top 114 of the power piston 100. The hydraulic fluid will be supplied by the pump (180 in FIG. 1) to the inlet port 52 then to the circumferential recess 104. From this point the fluid will enter one of the radial fluid passages 106, escape from the circumferential relief 110 into the lateral inlet passage 116 then into the longitudinal passage 112. Finally the fluid under pressure will pass to the circumferential recess 90 of the output side endcap 64. As fluid pressure builds in this circumferential recess 90 it will act on the surface 114 of the power piston 100 causing the piston to move to the right (in FIG. 3 or upward in FIG. 1) through the cylindrical chamber 92 compressing the power piston spring 162. The output rod 50 will follow the power piston 100 and thus effect the clutch linkage to disengage the clutch.

The power piston 100 will continue to move to the right as long as the spool valve portion 136 of the input rod 46 is not blocking flow of fluid from the radial fluid passages 206 and the circumferental relief 110. In order to make this possible the input rod 46 must be pulled out of the unit at the same rate that the power piston moves to the right in FIG. 3. This is done by the vehicle operator through the progressive depression of the suspended clutch pedal.

When progressive depression of the suspended clutch pedal is stopped by the operator the situation as shown in FIG. 4 arises. Movement of the input rod 46 has been stopped however the power piston 100 will continue to move toward the right until the circumferential relief 110 is completely blocked by the spool valve 136. At this point the power piston 100 will have reached equilibrium with fluid pressure on the top 114 of the power piston urging it to the right and a force from the power piston spring 162 (and clutch operating springs) urging the power piston to the left.

The spool valve portion 136 now covers (FIG. 4) both the radial fluid passage 106 and the lateral outlet passage 120 thus trapping fluid in the area at the top 114 of the power piston 100. Thus if the operator keeps the suspended clutch pedal depressed at one point such as the broken line view in FIG. 1 the power piston 100 will maintain the output rod 50 in a retracted position. In a practical application this would mean that the engine would be disconnected from the transmission via the disengaged clutch until the operator took his foot off the clutch pedal 20.

FIG. 5 shows the fluid path through the hydraulic amplifying fluid motor when the operator has released his foot from the suspended clutch pedal 20 and the power piston 100 is moving toward its position of repose at the left of the cylindrical chamber 92. First the input rod spring 154 acting between the inside surface of the spring cup 160 and the retainer means 156 of the input rod 46 biases the spool valve 136 to the left such that the chamfer 142 on the spool valve clears the circumferential relief band 122 of the lateral outlet passage (or passages per design) 120. This allows fluid to flow from the top 114 of the power piston 100 through the longitudinal passage 112 through the lateral outlet passages 120 to the non pressurized side of the power piston 100. Note that the spring cup 160 may be appropriately perforated to allow fluid to flow through it. From the non pressurized side of the power piston fluid will flow through the discharge port 56 to a reservoir 182 (FIG. 2). The power piston spring 162 provides biasing means urging the power piston to the left. This may be augmented by the clutch pedal spring 36 (FIG. 1) and/or the clutch springs (not shown).

Note that the inlet passage 116 allows fluid to pass from the reaction chamber 184 through the longitudinal passage 112 to the outlet passage 120. Passage 178 vents chamber 172 preventing fluid buildup in chamber 172 (178 shown only in FIG. 2 for clarity in other views).

Thus the basic operation of the hydraulic amplifying fluid motor has been shown in various stages of its deployment. Yet to be explained is the origin of the pressure feedback. The operator is provided with positive feedback as he is provided with a pressure signal proportional to that seen by the power piston. The reaction chamber 184 (FIG. 2) is supplied with fluid at the same rate as the chamber at the top of the power piston. As the reaction chamber 184 is pressurized this pressure is communicated by the input rod to the foot pedal 20. The operator then has a "feel" of the power piston being displaced. He can sense when the clutch becomes disengaged and also when it becomes re-engaged through reduced pedal effort.

Several other items of interest involve the spool valve 136. The chamber 142 and the sizes of the passages 120 are sized so that the clutch cannot re-engage overaggressively should the operator release the clutch pedal too suddenly. Also the spool valve length and adjacent port spacing are such that at no time are both ports uncovered. Thus there will not be a short circuit and a waste of hydraulic power through wasted flow.

Although the preferred embodiment discusses the use of the hydraulic amplifying fluid motor in the clutch operating mechanism of a tractor type vehicle it is apparent that there are other analogous areas that could accommodate and employ the device. For instance, it would be likely that the device could fine usefulness as a brake operating device, a hitch control device (draft control) or an implement for vehicle articulation control device, as well as other items. In these applications the feedback force would be beneficial to the operation. Another area of applicability would be for use in a gripping device where the feedback force will become an indicator to prevent crushing of the gripped item. It is also apparent that the usefulness of the item would not be confined to tractors. It would be logical to extend its applicability to automobile and truck areas as well as other diverse areas.

Throughout this disclosure the operating fluid being used has been hydraulic fluid. Other types of fluid could be used such as water, water-base hydraulic fluid, body fluids such as blood, etc. It would be expected that fluids of many types could function equally well.

Notice also that this fluid motor will operate without fluid pressure when it is not available. The positive engagement between the reactive piston portion of the input rod and the power piston will move with the movement of the input rod and the output rod will follow.

Thus it is apparent that there has been provided in accordance with the invention, a hydraulically actuated amplifying fluid motor that fully satisfies the objects aims and advantages set forth above. While the invention has been described in conjunction with specific embodiments thereof it is evident that many alternatives, modifications, and variations such as those set forth above will apparent to those skilled in the art in the light of the foregoing description. Accordingly, it is intended to embrace all such alternatives, modifications, and variations as found within the spirit and broad scope of the appended claims.

What is claimed is:

1. An amplifying fluid motor in communication with a source of fluid pressure for use in amplifying an input force to provide an output force in the direction of the input force of proportionally greater magnitude and further simultaneously providing a feedback force to the origin of the input force to indicate to the origin of the input force the proportional magnitude of the output force the amplifying fluid motor comprising:

a closed body having an inlet port in communication with the source of fluid pressure, a discharge port allowing the escape of spent fluid from said closed body, and a cylindrical chamber being surrounded by said closed body;

a power piston having a pressure side, a circumferential recess and a plurality of fluid passages including a radial fluid passage, a longitudinal passage, a lateral inlet passage (116), a lateral outlet passage (120) and a central aperture having a plurality of different diameter portions including a first portion receiving a spring and a cup, a second portion receiving a spool valve, and a third portion receiving a reaction piston;

an input rod having said smooth shaft portion, a spool valve portion capable of simultaneously blocking the radial fluid passage and the lateral outlet passage and a reactor piston portion slidably carried in the central aperture of said power piston;

an output rod having a smooth shaft portion and an enlarged portion restrained in the central aperture of said power piston;

a power piston spring biasing the power piston to an extreme of its travel in the cylindrical chamber of said body;

an input rod spring constrained on said input rod tending to urge said input rod longitudinally, toward the said output rod whereby movement of said input rod will result in movement of said output rod through the displacement of said power piston by fluid being directed through said circumferential recess, said radial fluid passage, said lateral inlet passage, and said longitudinal passage to the pressure side of said power piston.

2. The invention in accordance with claim 1 wherein the movement of said input rod in a longitudinal outward displacement from said body allows fluid to flow from the source of fluid pressure to the pressure side of said power piston as fluid will be allowed, through displacement of the spool valve, to pass from the radial fluid passage to lateral inlet passage (16) and the longitudinal passage (112) resulting in displacement of said power piston and said attached output rod in the direction of displacement of said input rod.

3. The invention in accordance with claim 1 wherein the movement of said input rod in a longitudinal inward displacement with respect to said body allows fluid to flow from the pressure side of said power piston to the discharge port of said body via the longitudinal passage 112 and the lateral outlet passage (120) through displacement of the spool valve portion of said input rod into the central aperture of said power piston whereby said output rod and said power piston will move longitudinally in the same direction as the input rod.

4. The invention in accordance with claim 1 wherein the fluid amplifying fluid motor will operate without the benefit of fluid pressure through positive engagement between the reactive piston portion of the input rod and the spool valve accommodating portion of the central aperture of said power piston whereby the power piston will move with the movement of said input rod and said output rod will follow said power piston as it is restrained in the central aperture of the power piston.

5. The invention in accordance with claim 1 wherein said power piston will be urged to its undisplaced position through force exerted on the power piston by said power piston spring.

6. A fluid assisted amplifying motor in communication with a source of fluid pressure for use in amplifying an input force to provide an output force in the direction of the input force of proportionally greater magnitude and further simultaneously providing a feedback force to the origin of the input force to indicate to the origin of the input force the proportional magnitude of the output force, the amplifying motor comprising:

a body having an inlet port in communication with the source of fluid pressure, a discharge port allowing the escape of unpressurized fluid, a removable apertured endcap at an input side and at an output side of said body and a cylindrical chamber interior of said body;

a power piston having a pressure side, a circumferential recess and a plurality of fluid passages including a radial fluid passage, a longitudinal passage, a lateral inlet passage, a lateral outlet passage and a central aperture having a plurality of different diameter apertures including a first portion receiving a spring and a cup, a second portion receiving a spool valve and a third portion receiving a reaction piston;

an input rod having a smooth shaft portion passing through the aperture of the input side endcap of said body, a spool valve portion equipped with circumferential fluid retaining grooves, the spool valve portion capable of blocking the radial fluid passage and the lateral outlet passage, and a reactor piston portion slidably carried in the central aperture of said power piston;

a spring cup having a flanged portion carried in the first receiving portion of said power piston;

an input rod spring carried on the smooth shaft portion of said input rod inboard of said spring cup;

a retainer means retaining said input rod spring on said input rod with said input rod spring located between said spring cup and said retainer means;

a power piston spring located between the input side endcap of said body and the flanged portion of said spring cup urging said spring cup into the first portion of said power piston and urging said power piston away from the input side endcap of said body;

an output rod having a smooth shaft portion passing through the aperture of the output side endcap of said body and an enlarged portion restrained in the third portion of said power piston whereby said output rod moves integrally with said power piston;

whereby movements of said input rod will result in movement of said output rod through the displacement of said power piston by fluid pressure being directed through said circumferential recess, said radial fluid passage, said lateral inlet passage, and said longitudinal passage to the pressure side of said power piston by displacement of said spool valve in said power piston.

* * * * *